Jan. 19, 1971   E. RIVETTI   3,555,822
MASTER CYLINDERS
Filed Feb. 13, 1969   9 Sheets-Sheet 6
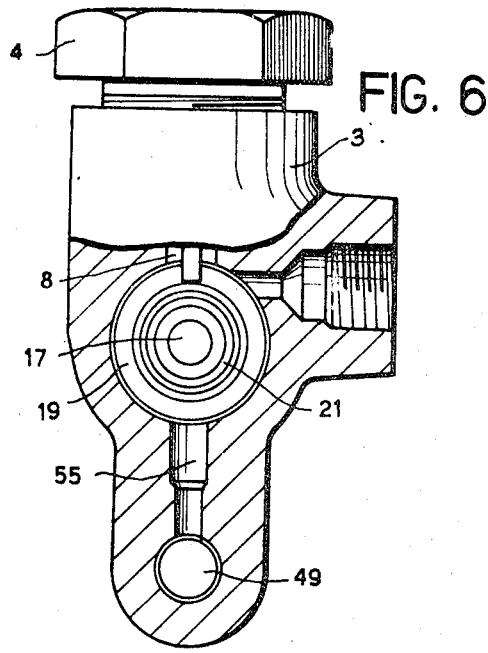
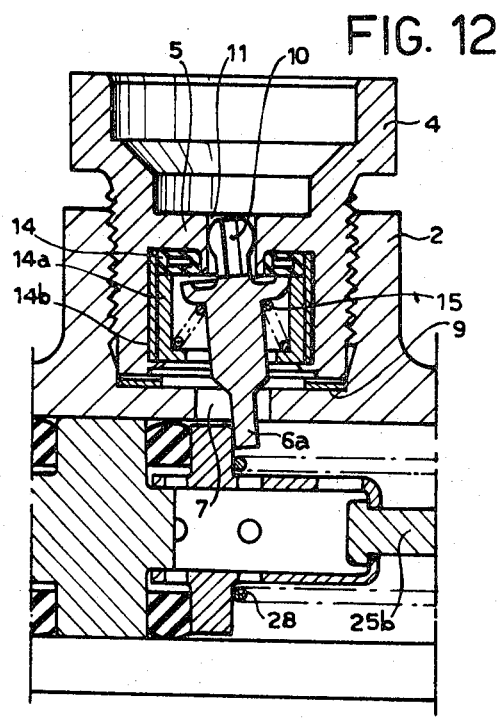

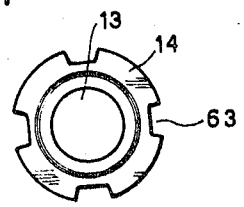
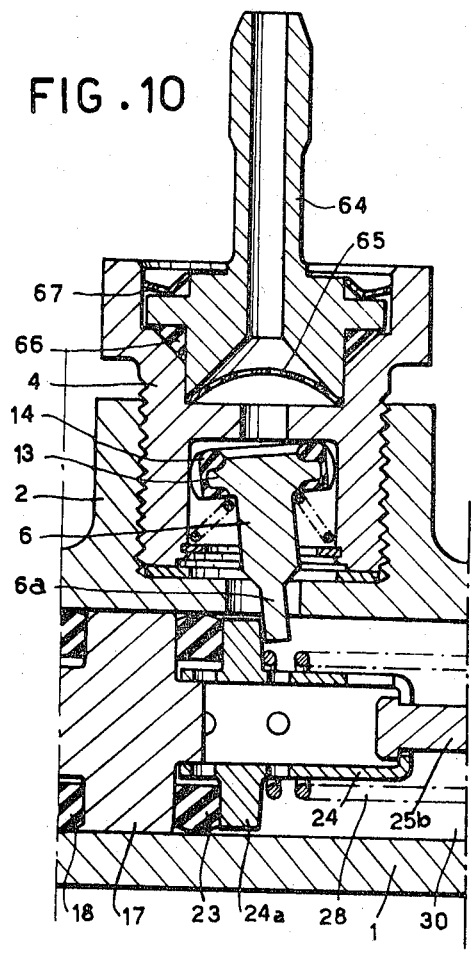
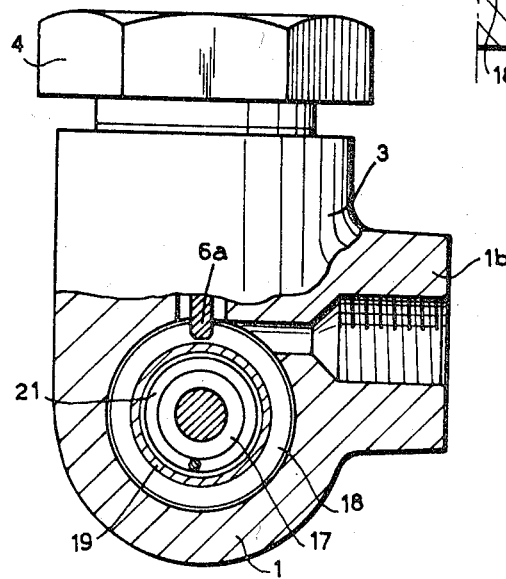

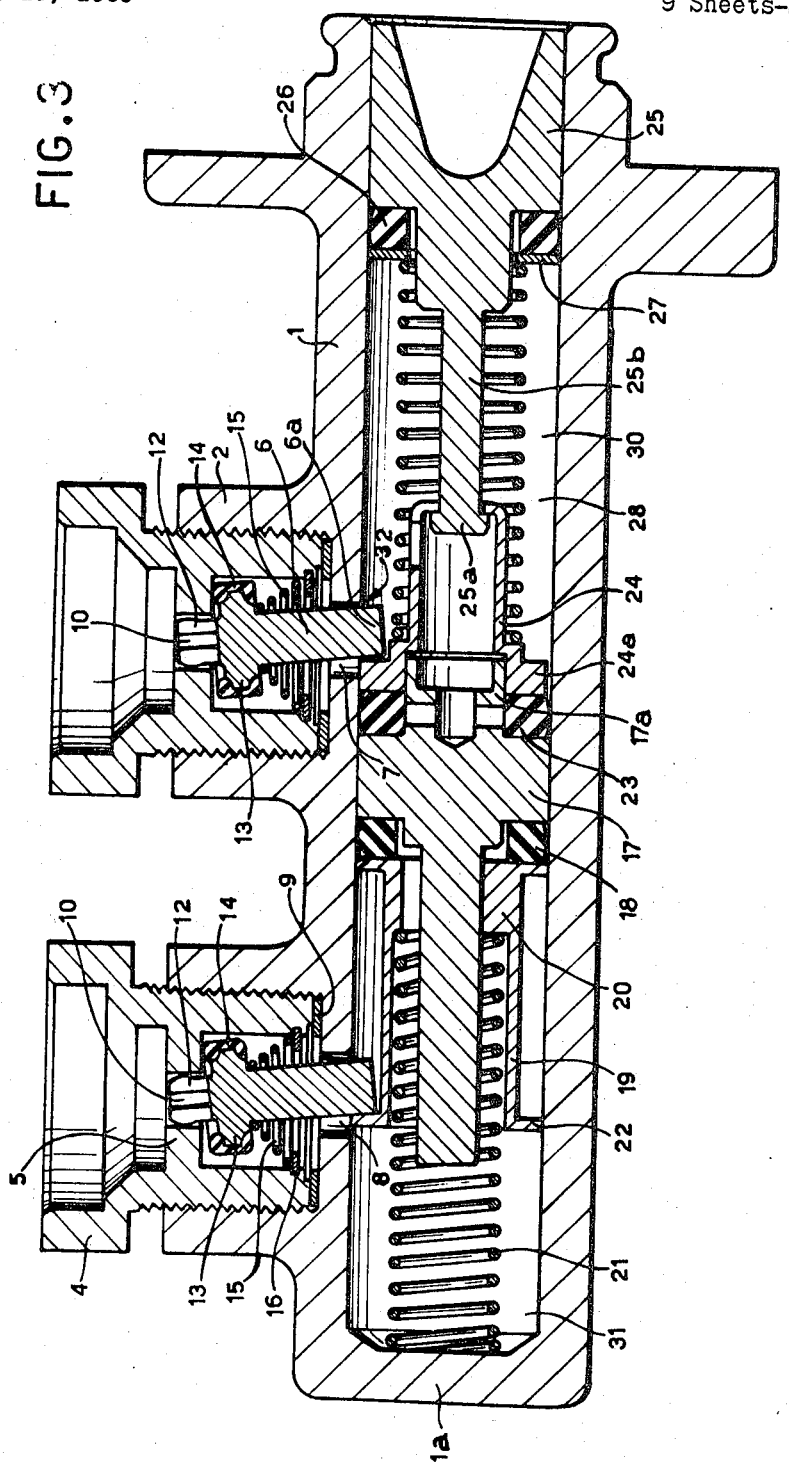

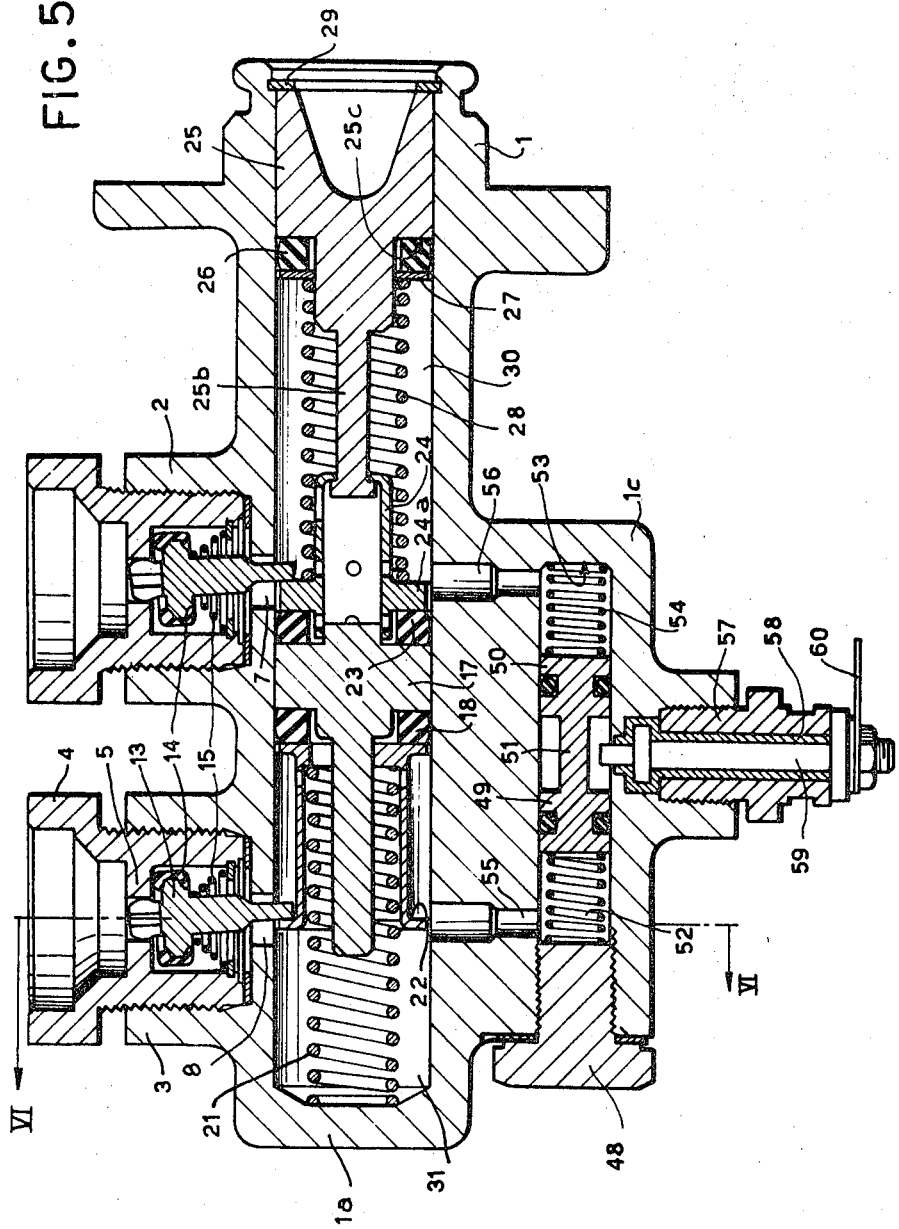

United States Patent Office 3,555,822
Patented Jan. 19, 1971

3,555,822
MASTER CYLINDERS
Enrico Rivetti, Turin, Italy, assignor to Fiat Societa per Azioni, Turin, Italy, an Italian joint-stock company
Filed Feb. 13, 1969, Ser. No. 799,004
Claims priority, application Italy, Feb. 17, 1968, 50,552/68; Feb. 4, 1969, 50,430/69
Int. Cl. F15b 7/08; F17k 47/00
U.S. Cl. 60—54.6        3 Claims

ABSTRACT OF THE DISCLOSURE

A master cylinder for fluid pressure braking systems having at least one valve device arranged inside a hollow plug screwed into a cup shaped boss formed on the cylinder body. The inside of the valve device is connected through a hole with a compression chamber defined at least at one end by a piston slidable inside the cylinder. The said valve device comprises an annular valve seat formed inside the hollow plug and a valve member constantly urged against said seat by a biassing spring. The valve member has an extension protruding inside the hole connecting the boss with the respective compression chamber, and the piston carries means, which may be integral therewith, which act on the extension so as to open the passage through the valve seat when the said piston is held in its inoperative position under the action of reaction spring means.

BACKGROUND OF THE INVENTION

Hydraulic pressure generators are known which comprise pumps or so-called master cylinders adapted to supply pressure liquid to utilizing apparatus of various types, such as wheel brake cylinders on motor vehicles, operating cylinders for friction clutches or the like, wherein the interconnection of the liquid reservoir and pressure cylinders is controlled by suitable normally open valves which close at the beginning of the compression stroke of the pistons slidably mounted in their respective cylinders.

In master cylinders of known type the valves are of a structure which does not afford a satisfactory operation and requires the pump, more particularly if the latter is called upon to simultaneously supply two separate circuits, to necessarily be of a considerable size in an axial direction.

The invention provides a master cylinder of the above-mentioned type wherein the valve or valves controlling the interconnection of the pressure chamber or chambers and reservoir are of a structure which avoids the above-mentioned drawbacks and is at the same time simple in construction and relatively inexpensive.

SUMMARY OF THE INVENTION

According to this invention the master cylinder comprises for the above purpose at least one piston confining therein a compression chamber and means for controlling interconnection of the latter with the reservoir, having the characteristic feature that the means comprise, in association with each compression chamber, a valve device accommodated by a boss, the inside of which connects with the said compression chamber, comprising an annular seating and a valve biassed by spring means and by a member capable of movement jointly with the piston so as to clear a passage through the said seating when the piston is in its inoperative position and to close the passage as soon as the piston starts its compression stroke.

Further characteristic features and advantages of the invention will be understood from the appended description referring by way of example to embodiments shown on the accompanying drawings, wherein:

BRIEF DESCRIPTION OF THE DRAWINGS

FIG. 2 is an end view of the cylinder shown in FIG. 1 in the direction of the arrow II shown in the figure;

FIG. 3 is a longitudinal sectional view of a double master cylinder according to a modified embodiment;

FIG. 5 is a longitudinal sectional view of a double master cylinder of the type shown in FIG. 1, coupled with a device for indicating the failure of one of the utilizing circuits fed by the cylinder, FIG. 6 is a sectional view on line VI—VI of FIG. 5.

FIG. 10 is a part longitudinal sectional view of a double master cylinder according to a further modified embodiment, FIG. 11 is a plan view of the valve on the master cylinder shown in FIG. 10, FIG. 12 is a part longitudinal sectional view of a modification of the invention.

DETAILED DESCRIPTION OF THE PREFERRED EMBODIMENT

Corresponding parts are denoted throughout the figures by the same reference numbers.

Figure 1:
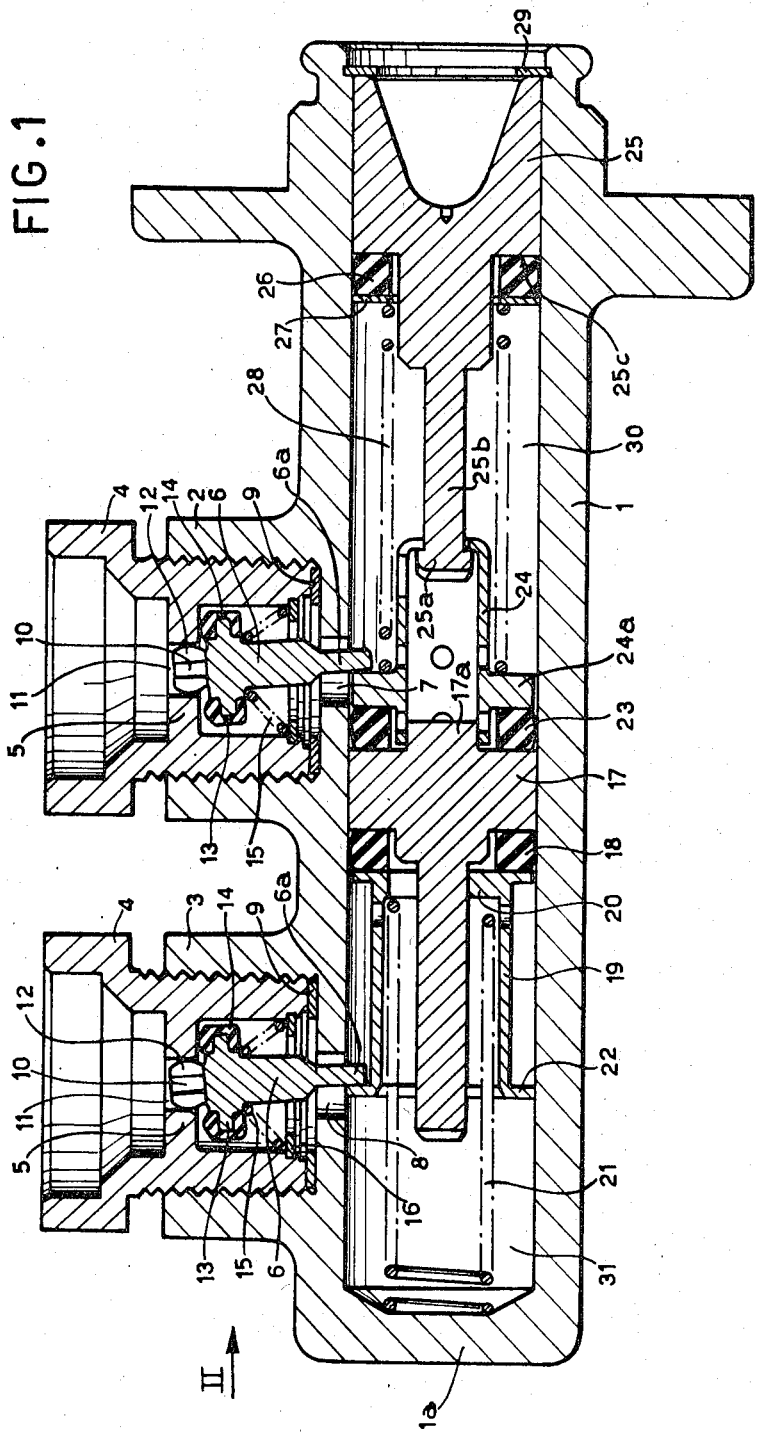
FIG. 1 is a logitudinal section of a master cylinder of the type adapted to supply two separate utilizing circuits.

The cylinder shown in FIG. 1 comprises a body portion 1 provided at the top with two bosses 1, 3, respectively, into which similar hollow plugs 4 are screwed connecting with one or plurality of tubular reservoirs (not shown). Each connector is provided with an inner flange forming the seat for a valve 6 formed with an extension 6a extending through a hole 7, 8, respectively, connecting the inside of the boss 2, 3, respectively, with the longitudinal bore in the cylinder 1. The hollow plugs 4 bear on the bottoms of their respective bosses through the interposition of sealing members 9. The end of the valve 6 remote from the extension 6a is formed with a spherical head 10 centered on the diameter of the hole 11 defined by the cylindrical inner edge of the flange 5. The spherical head 10 is formed with through notches 12 arranged crosswise adapted to let the liquid through the hole 11 when the valves are in the positions shown in FIG. 1. The valve 6 is provided near the spherical head 10 with an annular head 13 lined with an annular sealing member 14 made of resilient material of U-shape in cross section, turned towards the axis of the shutter 6.

The latter is constantly biassed towards the seat formed by the flange 5 by a conical helical spring 15 interposed between the head 13 and a washer or resilient ring 16 accommodated by a groove in the inner wall of the hollow plug 4 in proximity to the end of the latter adjacent the annular seal 9.

A piston 17 is slidably mounted with a small radial clearance within the cylinder 1 at the section of the bore in the latter between the holes 7 and 8 connecting with the inside of the bosses 2, 3, respectively.

An annular sealing member 18, of resilient material, such as rubber, is fitted to the face of the piston 17 turned towards the bottom 1a of the cylinder 1. The sealing member is of such shape that its diameter before assembly in the longitudinal bore in the cylinder 1 is slightly larger than the diameter of the bore. The sealing member 18 is pressed against the piston 17 by a radial flange formed at one end of the sleeve 19, which is substantially smaller in diameter than the longitudinal bore in the cylinder and is formed with an inner radial abutment 20 abutted by the reaction spring 21, the opposite end of which bears against the bottom 1a of the cylinder 1. The sleeve 19 is provided at its end remote from the annular sealing member 18 with a flange 22 situated between the bottom 1a of the cylinder and the extension 6a on the shutter 6 accommodated by the connector screwed into the boss 3 on the body portion 1 of the cylinder nearer its respective bottom portion 1a.

On the piston side remote from the sealing member 18 a further annular sealing member 23 is arranged and is pressed against the piston 17 by the radial flange 24a of a cup 24 centered on a short axial projection 17a on the piston 17 and engaged by the head 25a on the axial extension 25b on a further piston 25. The latter is formed with a circumferential radial abutment 25c turned towards the piston 17 and abutted by an annular sealing member 26 made of resilient material, such as rubber, biassed against the abutment through the interposition of a washer 27 by a helical spring 28 bearing by its other end against the radial flange on the cup 24. The expansible ring 29 accommodated by an annular groove in the wall of the longitudinal bore in the cylinder 1 near the end of the latter remote from the bottom portion 1a, prevents the piston 25 and associated components to be removed from the cylinder by the bias of the springs 28, 21, respectively.

In the position shown in FIG. 1, in which the master cylinder is inoperative, the annular flange 22 on the sleeve 19 and annular flange 24a on the cup 24 exert thrusts in a direction opposite the bottom portion 1a of the cylinder 1 on the extensions 6a on the valves 6 holding the annular sealing members 14 surrounding the head portions removed from the flanges 5, thereby establishing communication through the holes 11.

When a thrust is exerted on the piston 25 by known means, not shown on the drawings, in the direction of the bottom portion 1a of the cylinder 1, the thrust is transmitted through the spring 28 to the piston 17 which compresses the reaction spring 21. The spring 28 does not initially undergo any compression owing to its stiffness exceeding the stiffness of the spring 21. The two pistons are therefore at first bodily displaced. Their movement in the direction of the bottom portion 1a results in a similar displacement of the radial flanges 22 and 24a and displacement of the valves 6 on the valves arranged in the plugs 4 screwed into the bosses 2 and 3 from their inclined position shown in FIG. 1 to a position in which the valves are arranged perpendicular to the axes of the holes 11 and are biassed by the springs 15 thereby intercepting the holes 11. This cuts off the connection of the compression chambers 30 and 31, respectively, and the reservoirs (not shown) connecting with the inside of the plugs 4, so that the liquid may flow from the compression chambers through lateral connectors 1b (FIG. 2).

The structure shown in FIG. 3 differs from FIGS. 1 and 2 essentially through the absence of the resilient ring 29. The function of the latter is now performed by the extension 6a on the valve 6 of the valve accommodated in the plug 4 screwed into the boss 2 on the cylinder. Removal from the latter of the components fitted into the longitudinal bore is prevented by clamping of the extension between the radial flange 24a fast with the piston unit biassed by the reaction springs 21, 28 and the edge 32 of the hole 7 interconnecting the inside of the boss 2 and the longitudinal bore in the cylinder.

Figure 4:
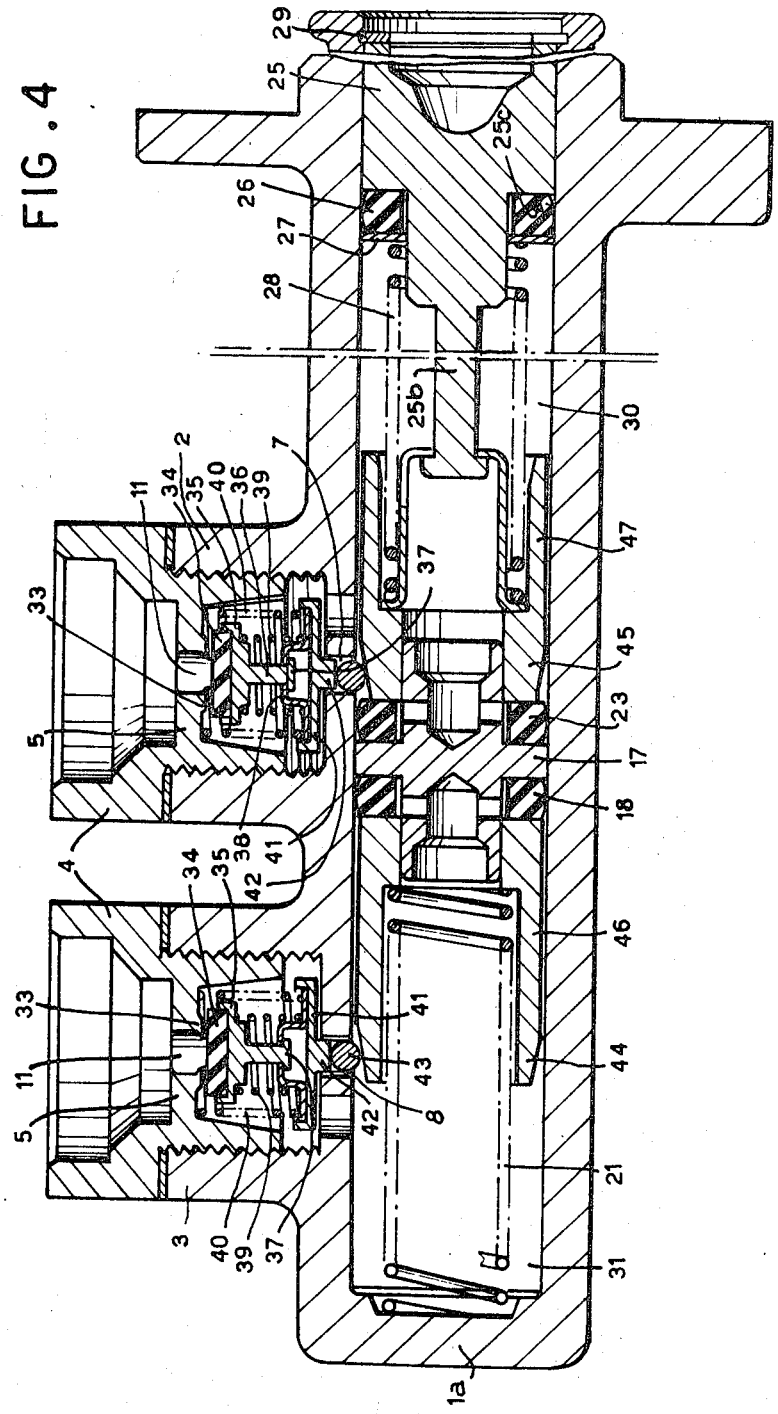
FIG. 4 is a longitudinal sectional view of a double master cylinder according to a further modified embodiment.

In the construction shown in FIG. 4 the flange 5 forming the seat of the valve is formed on its side turned towards the bottom of the bosses 2, 3 with an annular lip 33. The lip is the seat proper having cooperating therewith a disc-shaped sealing member 34 made of rubber carried by the head 35 of the valve shutter. The shank 36 of the shutter is provided at its end remote from the head 35 with an enlargement 37 for engagement with a cup 38. The latter is abutted by two springs 39, 40, respectively, the former spring being interposed between the cup 38 and head 35, the latter spring being interposed between the cup 38 and the part of the flange 5 situated externally of the annular lip 33. With this arrangement opening and closing of the valve is controlled by the spacing of the cup 38 and annular seat 33 cooperating with the sealing member 34.

The cup 38 is carried by a flanged disc 41 provided with a spigot 42 and reaches into the hole 7, 8, respectively connecting the inside of the bosses 2, 3, with the longitudinal bore in the cylinder. A ball 43 is arranged beneath each spigot and bears on the frusto-conical end portion 44, 45, of the sleeve 46, 47 abutting the reaction springs 21, 28. Obviously, on movement of the piston 25 in the direction of the bottom portion 1a of the cylinder, the balls press the flanged discs 41 simultaneously upwardly and draw the sealing members 34 towards the annular lips 33, thereby intercepting the interconnection of the compression chambers 30, 31 and reservoirs (not shown) connecting with the plugs 4 screwed into the bosses 2, 3 in the cylinder 1.

The cylinder shown in FIGS. 5, 6, differs from the construction shown in FIG. 1 in that its body portion 1 is provided with a bottom enlargement in which a blind additional cylindrical seat is formed the axis of which extends parallel with the longitudinal bore in the cylinder having the pistons 17, 25 slidable therein. The additional seat is closed by the plug 48 and has slidably mounted therein a piston provided with two heads 49, 50, respectively, separated by an intermediate shaft 51. A spring 52 is interposed between the head 49 and plug 48 and a spring 54 is interposed between the head 50 and bottom 53 of the seat. The chamber accommodating the spring 52 connects with the compression chamber 31 through a hole 55 aligned with the hole 8 connecting the longitudinal bore in the cylinder with the inside of the boss 3. The chamber accommodating the spring 54 is connected with the compression chamber 30 by a through hole 56 aligned with the hole 7 connecting the longtudinal bore in the cylinder with the inside of the boss 2. The seat having the piston 49, 50, 51 slidable therein connects about half way from the conduits 55, 56 with a hole tapped in part having screwed therein an electrode-holder 57 through which an electrode 59 extends through the interposition of a layer of insulating material 58 and is connected by a lead 60 with the circuit of an optical or acoustic indicator (not shown) indicating failure of any brake circuit. The end of the electrode 59 remote from the lead 60 reaches into the seat having the piston 49, 50, 51 mounted therein at the portion of the seat confined by the piston heads 49, 50. The springs 52, 54 are such that the piston is in its position shown in FIG. 5, in which it does not contact the electrode 59 when the same hydraulic pressure prevails in the pressure chambers 30, 31. Where any circuit fails such as on account of breakage of the pipes leading from the master cylinder to the wheel brake cylinders, the forces acting on the piston 49, 50, 51 become unbalanced, the piston being longitudinally moved till one head thereon contacts the electrode 59, thereby closing the circuit of the indicator.

Figure 7:
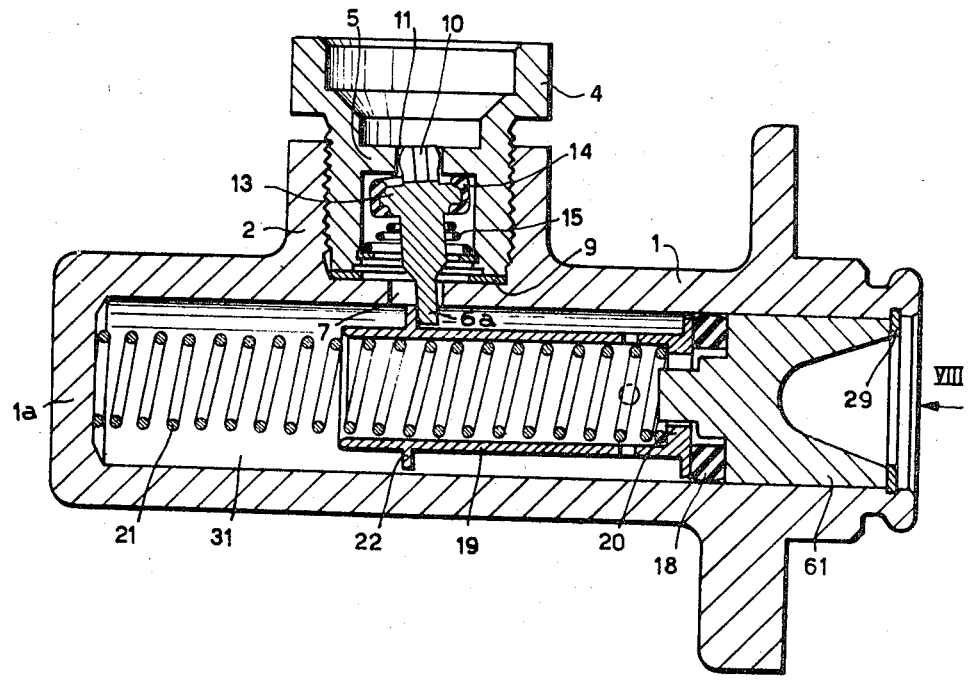
FIG. 7 is a longitudinal sectional view of a simple master cylinder improved according to the invention.

FIG. 7 shows a simple master cylinder provided in the conduit between its compression chamber and reservoir (not shown) with a valve device of the same type as the valve on the double master cylinder shown in FIGS. 1 and 2. The structure of the cylinder is substantially the same as the structure of the part of the double master cylinder shown in FIGS. 1 and 2 between the boss 2 and bottom portion 1a, with the difference that the piston 17 is replaced by a piston 61 smilar to the piston 25 in FIG. 1, but for a substantially shorter axial projection in the direction of the bottom portion 1a of the cylinder 1.

Figure 9:
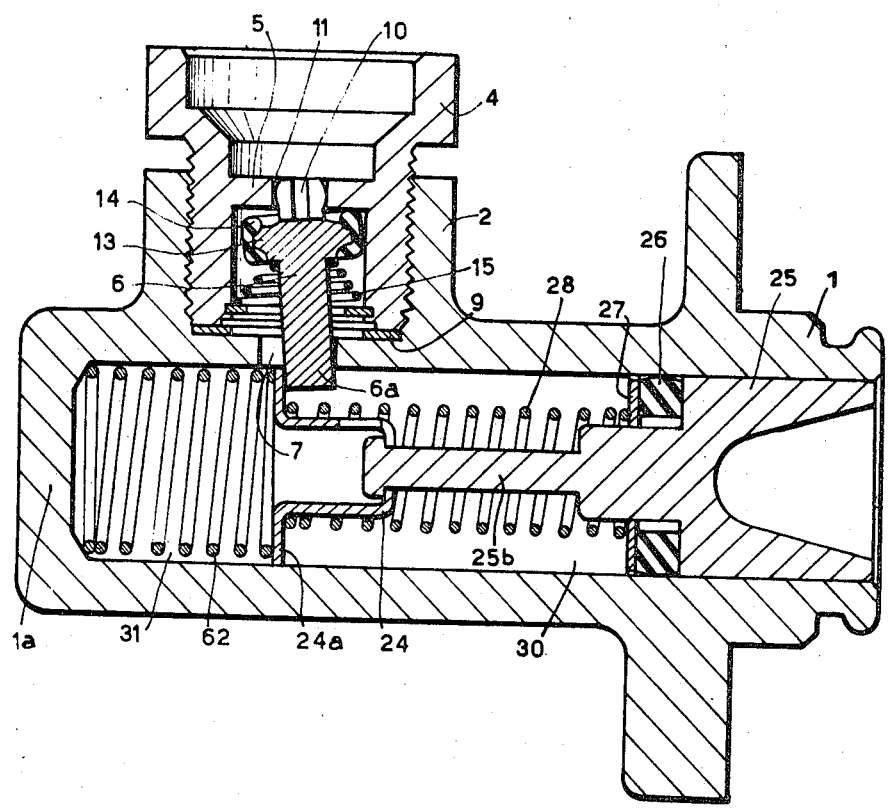
FIG. 9 is a longitudinal sectional view of a simple master cylinder according to a modified embodiment.

The construction shown in FIG. 9 is the result of the use in connection with a simple master cylinder, having one compession chamber, of the principle adopted in the double master cylinder in FIG. 3.

Similarly to the latter, in the simple master cylinder shown in FIG. 9 the piston is retained within the cylinder 1 by the end reaching into the longitudinal hole in the extension of the valve controlling the interconnection of the compression chamber and hollow plug adapted to be connected with the reservoir (not shown).

Figure 8:
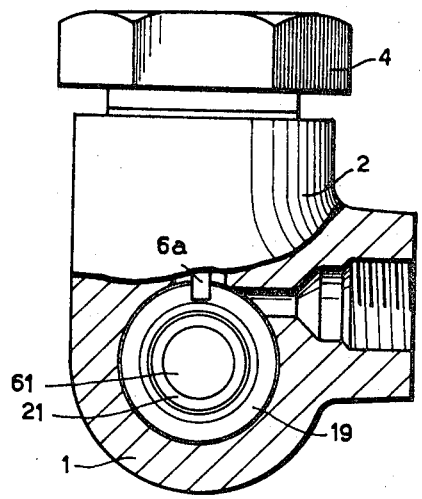
FIG. 8 is a part sectional end view in the direction of the arrow VIII in FIG. 7.

The structure of the cylinder is essentially similar to the right-hand portion of the double master cylinder in FIG. 3, but for the addition of the reaction spring 2 which is less stiff than the spring 28. With this arrangement a simple master cylinder is obtained, the overall length of which is less than the length of the master cylinder shown in FIGS. 7 and 8.

FIG. 10 shows a modification of the valve in which the valve is centered on the diameter of the hole in the portion of the hollow plug 4 adapted to be fitted into the boss in the cylinder. For this purpose the valve is provided with a head having a spherical skirt formed with axial notches 63 letting through the liquid when the valve is in its open position shown in FIG. 10.

The same figure shows means comprising the subsidiary hollow plug 64 provided with a filter 65, the sealing member 66 and expansible resilient ring 67 for connecting the hollow plug 4 by means of a pipe with a reservoir (not shown).

FIG. 12 shows a modified valve embodiment differing from FIGS. 1 and 3 through the resilient member 14 which, instead of being fixedly secured to the movable portion 6, is secured to the valve holder by means of a bushing 14a, 14b.

Figure 13:
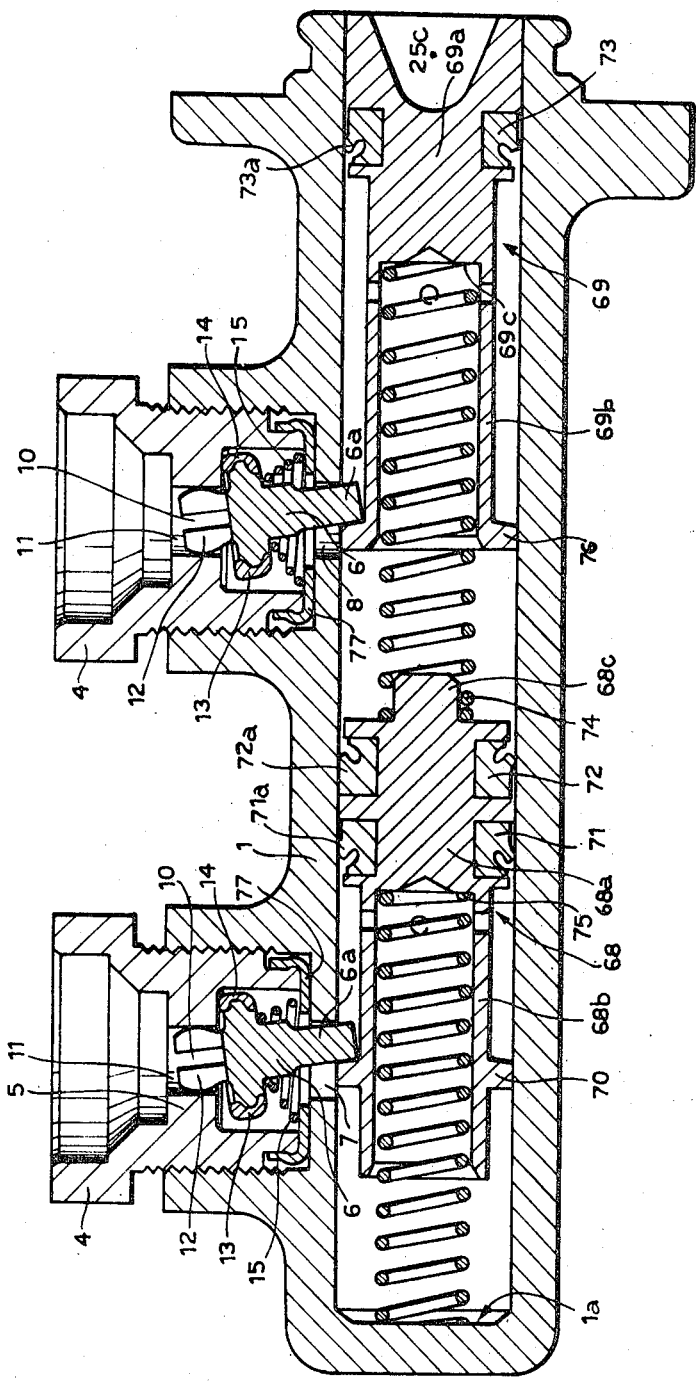
FIG. 13 is a longitudinal sectional view of a double master cylinder according to a further embodiment.

In the modified embodiment shown in FIG. 13 the pistons 68, 69 are each made of a single piece. The head portion 68a of the former carries a tubular extension 68b which extends towards the bottom 1a of the cylinder. The extension is formed with an annular flange 70 acting on the extension 6a on the valve 6 nearer the abovementioned bottom 1a. The head 68a is formed with two annular circumferential grooves seating annular sealing members 71, 72, respectively.

The sealing member 71 is formed with a lip 71a resiliently pressed against the wall of the bore in the cylinder 1 and turned towards the bottom 1a. The sealing member 72 is formed with a similar lip 72a which is oppositely directed.

The piston 69 is provided with a head portion 69a in the circumference of which an annular groove is cut which seats a sealing member 73 similar to the sealing members 71, 72, the lip 73a of which is turned towards the bottom 1a. The head portion 69a carries an extension 69b seating a portion of the reaction spring 74. The latter is centered on the middle cylindrical projection 68c formed on the head of the piston 68 at the end of the latter turned towards the piston 69. It differs from the reaction spring 75 interposed between the cylinder bottom 1a and the bottom 68d of the tubular extension 68b on the piston 68 solely in length. The extension 69b on the piston 69 is formed at its free end with an outer annular flange 76. This flange cooperates with the extension 6a on the shutter 6a which is distal from the cylinder bottom.

A further feature of the modified embodiment according to FIG. 13 which distinguishes it from the previously described embodiments resides in the fact that the springs 15 acting from below on the valve 6 bear on annular cups 77 rolled to the smooth ends of the portions of the hollow plugs 4 adapted to be secured within the through openings in the bosses 2, 3, respectively. The modified embodiment shown in FIG. 3 distinguishes from the other embodiments in that it is simpler in construction, cheaper in manufacture and speedier to assemble and disassemble on initial assembly and for inspection and maintenance purposes.

It will be understood that, within the principle of the invention, details can be widely varied with respect to the example described and shown without departing from the scope of the invention.

What I claim is:

1. In a master cylinder having a body containing an axial bore, two pistons mounted within said bore and defining two compression chambers, a spring urging each piston towards an inoperative position, two hollow bosses formed on the body, two hollow plugs each one being inserted into and connected to one hollow boss each plug communicating one of the compression chambers to a reservoir, a valve member in each hollow plug for controlling the passage through each plug between the respective compression chamber and the reservoir, a stationary annular valve seat arranged inside each plug, a valve spring which biases the valve member into a closed position against the valve seat and a first extension on each valve member reaching into each compression chamber through the hole communicating the compression chamber with the hollow plug and means formed on each piston for contacting the first extension when the piston is in an inoperative position to incline the valve axis in relation to the axis of the annular seat and thereby maintain the valve in its open condition; the improvement comprising a second extension on the valve member having a spherical surface centered in the hole which communicates the hollow plug to the reservoir, the spherical surface having axial notches which provide flow paths through the hole.

2. The master cylinder as claimed in claim 1 further comprising an annular cup fitted over the end of each hollow plug and providing a surface for one end of the valve springs within the hollow plug.

3. In a master cylinder having a body containing an axial bore, two pistons mounted within said bore and defining to compression chambers, a spring urging each piston towards an inoperative position, two hollow bosses formed on the body, two hollow plugs each one being inserted into and connected to one hollow boss each plug communicating one of the compression chambers to a reservoir, a valve member in each hollow plug for controlling the passage through each plug between the respective compression chamber and the reservoir, a stationary annular valve seat arranged inside each plug, a valve spring which biases the valve member into a closed position against the valve seat and a first extension on each valve member reaching into each compression chamber through the hole communicating the compression chamber with the hollow plug and means formed on each piston for contacting the first extension when the piston is in an inoperative position to incline the valve axis in relation to the axis of the annular seat and thereby maintain the valve in its open condition; the improvement comprising an annular cup fitted over the end of each hollow plug and providing a surface for one end of the valve spring within the hollow plug.

References Cited

UNITED STATES PATENTS

| 2,574,923 | 11/1951 | LaBrie | 60—54.6 |
| 2,880,584 | 4/1959 | French | 60—54.6 |
| 3,060,691 | 10/1962 | Davis | 60—54.6E |
| 3,064,432 | 11/1962 | Shutt | 60—54.6E |
| 3,232,059 | 2/1966 | Thesier | 60—54.6 |
| 3,416,315 | 12/1968 | Wortz | 60—54.6E |

MARTIN P. SCHWADRON, Primary Examiner

R. BUNEVICH, Assistant Examiner

U.S. Cl. X.R.

251—125